United States Patent
Olesen

(10) Patent No.: US 9,217,413 B2
(45) Date of Patent: Dec. 22, 2015

(54) WIND TURBINE OPTICAL WIND SENSOR

(75) Inventor: Ib Svend Olesen, Randers (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 107 days.

(21) Appl. No.: 14/114,448

(22) PCT Filed: May 3, 2012

(86) PCT No.: PCT/DK2012/050148
§ 371 (c)(1),
(2), (4) Date: Jan. 15, 2014

(87) PCT Pub. No.: WO2012/149940
PCT Pub. Date: Nov. 8, 2012

(65) Prior Publication Data
US 2014/0125058 A1   May 8, 2014

Related U.S. Application Data

(60) Provisional application No. 61/482,627, filed on May 5, 2011.

(30) Foreign Application Priority Data

May 4, 2011   (DK) ................................. 2011 70219

(51) Int. Cl.
*G01P 5/00* (2006.01)
*G01W 1/00* (2006.01)
*F03D 7/02* (2006.01)
*G01P 15/093* (2006.01)
(Continued)

(52) U.S. Cl.
CPC ................ *F03D 7/0204* (2013.01); *F03D 7/02* (2013.01); *G01P 5/20* (2013.01); *G01P 5/26* (2013.01); *G01P 13/045* (2013.01); *G01P 15/093* (2013.01)

(58) Field of Classification Search
None
See application file for complete search history.

(56) References Cited

U.S. PATENT DOCUMENTS 6,320,272 B1 * 11/2001 Lading et al. .................... 290/44
8,381,599 B2 *  2/2013 Bosselmann .............. 73/861.18
(Continued)

FOREIGN PATENT DOCUMENTS

| GB | 2468693 A | 9/2010 |
| WO | 2005/093435 A1 | 10/2005 |

(Continued)

OTHER PUBLICATIONS

Danish Search Report, PA 2011 70219, Jan. 16, 2012.
(Continued)

*Primary Examiner* — Andre Allen
(74) *Attorney, Agent, or Firm* — Patterson & Sheridan LLP

(57) ABSTRACT

The invention comprises a wind turbine optical wind sensor 10 mounted on the rotor 4 of a wind turbine, either on the blades 5 or on the hub 5. The sensor comprises a plurality of light sources, each generating respective sensor beams made up of at least two individual parallel component sensor beams. Transit times for particulate matter carried in the wind breaking the at least two component sensor beams are used to provide one or more of an indication of wind speed and/or a component of vertical wind speed. The data received from the sensor can be used in control processes for the operation of the wind turbine, particularly for temporarily pitching the rotor blades in adverse wind conditions, such as when vertical wind gusts are detected.

24 Claims, 10 Drawing Sheets

(51) Int. Cl.
*G01P 5/20* (2006.01)
*G01P 5/26* (2006.01)
*G01P 13/04* (2006.01)

(56) References Cited

U.S. PATENT DOCUMENTS 8,712,703 B2 * 4/2014 Olesen .............................. 702/34
8,733,164 B2 * 5/2014 Olesen ........................ 73/170.06
8,983,243 B2 * 3/2015 Philipsen et al. ............... 385/13

FOREIGN PATENT DOCUMENTS

WO 2006/063463 A1 6/2006
WO 2010/086631 A2 8/2010

OTHER PUBLICATIONS

International Search Report and Written Opinion, PCT/DK2012/050148, Aug. 2, 2012.

* cited by examiner

WIND TURBINE OPTICAL WIND SENSOR

The present invention relates to a wind energy power plant, and in particular to a wind turbine optical wind sensor.

FIG. 1 illustrates a wind energy power plant such as a wind turbine 1. The wind turbine 1 comprises a wind turbine tower 2 on which a wind turbine nacelle 3 is mounted. A wind turbine rotor 4 comprising at least one wind turbine blade 5 is mounted on a hub 6. The hub 6 is connected to the nacelle 3 through a low speed shaft (not shown) extending from the nacelle front. The wind turbine illustrated in FIG. 1 may be a small model intended for domestic or light utility usage, or may be a large model, such as those that are suitable for use in large scale electricity generation on a wind farm for example. In the latter case, the diameter of the rotor could be as large as 100 meters or more.

In order to safely and efficiently extract energy from the wind, many wind turbines include anemometers or wind sensors that provide information about the incident wind speed and direction. Such information is useful for monitoring the amount of wind available at the site for energy generation purposes, as well as for control. Knowing the wind direction allows the yaw of the wind turbine nacelle to be adjusted so that the rotor blades face fully into the incident wind during times of energy production. Further, knowing the speed of the wind allows the pitch of the rotor blades to be adjusted so that the amount of energy extracted from the incident wind can be carefully controlled to meet demand and satisfy other operational parameters. It is often necessary, for example, to angle the plane of the wind turbine rotor blades out of the wind, or to adjust the pitch of the rotor blades to spill the wind, to avoid structural problems or electrical overloads associated with wind speeds that are too high.

Accurate information regarding wind speed and direction is therefore a crucial input in wind turbine control and monitoring systems, such as the SCADA system.

The operational environment in which wind turbine wind sensors are deployed can be severe and is often the main cause of many sensor operational difficulties. Mechanical anemometers, for example, are liable to fail through the accumulation of dirt and ice on their moving parts. While electrical or laser based wind sensors, such as those based on LIDAR (Light Detection and Ranging) apparatus are more capable of withstanding dirt and ice, they are more susceptible to damage from lightning strikes that frequently trouble wind turbines due to their height and location. LIDAR base systems are also relatively expensive to install.

The use of lighting conductors provides one way of drawing the energy from a lightning strike away from sensitive equipment. However, lighting conductors will not always adequately protect sensor equipment, which by reason of including metallic components such as wiring and circuits, is equally receptive to damage from an electrical discharge and induced currents.

Additionally, many wind turbines operate under the assumption that the wind meeting the wind turbine rotor blades approaches the rotor head-on, and in a direction normal to the plane of rotation of the rotor blades (the rotor plane). In practice, however, the wind can often have a significant component in the vertical direction due to wind gusts. These may arise spontaneously due to changes in atmospheric conditions and wind direction, and sometimes may be exaggerated due to the shape of the terrain where the wind turbine is situated. Many wind turbines have anemometers located on the nacelle that direct incident wind speed and direction, or LIDAR based systems on the rotor hub that monitor for wind gusts approaching the turbine. Such systems are not designed however to detect gusts of wind that approach the turbine with a strong vertical component. Such wind gusts can seriously damage the wind turbine rotor blades if they are not detected in advance, and if the blades are not pitched accordingly to deflect the brunt of the wind.

We have therefore appreciated that there is a need for a wind energy power plant having a sensor that can accurately provide information about the incident wind for control and monitoring purposes, and that can reliably operate despite the challenges referred to above.

SUMMARY OF THE INVENTION

The invention is defined in the independent claims to which reference should now be made. Advantageous features are set out in the dependent claims.

According to a first aspect of the invention there is provided a wind turbine optical wind sensor, comprising: a plurality of light sources mounted on the rotor of a wind turbine, such that in use the light sources rotate around the rotational axis of the rotor; wherein each light source is positioned to emit a sensor beam having at least a first directional beam component orthogonal to the rotational axis of the rotor, and wherein each sensor beam is made up of at least two parallel component sensor beams; a plurality of light receiving devices mounted on the rotor, such that in use the light sources rotate around the rotational axis of the rotor, and wherein the plurality of light receiving devices are positioned such that each sensor beam is associated with at least a first respective light receiving device to detect flashes of light from particulate matter in the wind that passes through the at least two component sensor beams; a controller, coupled to the plurality of light receiving devices for processing the detected flashes of light and determining transit times for particulate matter passing through the respective at least two component sensor beams, and based on the detected transit times giving an indication of one or more of the speed and/or direction of motion of the particulate matter in the wind.

As the sensor is located on the wind turbine rotor it can be used to detect instantaneous variations in the wind speed and direction at the rotor blade, and allow the controller to take immediate action to ensure safe operation of the blades.

In one embodiment, the at least two of the sensor beams have second directional beam components that are parallel to the rotational axis of the rotor; and wherein the controller is configured to: determine, from respective flashes of the component sensor beams, a transit time for particulate matter passing through each of the at least two sensor beams; compare the respective transit times for each sensor beam; and determine an indication of the vertical velocity component for the wind direction.

In this way, the controller can detect gusts of wind in the vertical direction that could damage the blades.

Advantageously, the controller is configured to determine whether the indication of the vertical velocity component of the wind is above a threshold level, and issue an alarm signal.

The controller may also be configured to determine whether the indication of the vertical velocity component of the wind is above a threshold level, and if it is, to pitch the wind turbine blades to spill the wind.

In one embodiment, the sensor comprises an orientation sensor for determining the orientation of the hub, or of one or more of the blades, and wherein the controller records for each detected transit time the orientation of the sensor beams where the flashes were detected. This allows the sensor to operate with more reliability.

In one embodiment, the light sources are mounted on the rotor blades, such that the sensor beam projects both in the longitudinal direction of the blade and in front of the blade; and wherein the light detectors are located on the rotor blades, adjacent to respective light sources and positioned to detect flashes of light from particulate matter in the wind that passes through the at least two component sensor beams.

In this way, the sensors are located where the data that they provide is most indicative of the operational situation at the rotor blade.

The sensor beams project in front of the rotor blades, at an angle of between 10 and 80 degrees to the horizontal axis. More preferably, the sensor beams project in front of the rotor blades, at an angle of between 30 and 60 degrees to the horizontal axis. This ensures a good signal to noise ration in the detected flashes of light.

A plurality of light sources and light detectors may be located on each rotor blade. By mounting the sensors on the blades, the sensor can be used to detect vertical components of wind velocity across the entire radius of the rotor blade.

In a further embodiment, the light sources and light receiving devices are mounted on the rotor hub. This has the advantage of ease of installation and maintenance, and means that the operation of the sensor is independent of pitch movements of the blades.

One or more of the light sources and the light detectors may be mounted on a bar protruding from the rotor hub. This allows the sensor system to be properly accommodated irrespective of the hub dimensions.

The bar may protrude in front of the rotor hub, and be mounted for coaxial rotation with the axis of rotation of the rotor hub.

In this arrangement, the at least two sensor beams are arranged in a sequence, e.g. separated by 180 degrees around the axis of rotation, as this maximises the detection effect.

In one embodiment, data indicating the vertical velocity component for the wind direction is collected over an extended period of time by the controller and transmitted to a wind park operator. This allows wind park or utility operators to determine whether the location of the wind turbine has a propensity for wind gusts in the vertical direction.

Alternatively, the light sources may be arranged on the rotor hub, such that the sensor beams are projected parallel to the rotor plane; and the light receiving devices are located in the rotor blades. This provides an advantageous anemometer, able to measure a wind speed closer to the free wind speed.

Advantageously, the at least two parallel component sensor beams have different wavelengths of light in comparison to one another, and hence the reflections are of different wavelengths. This provides better detection of transit times, and by detecting which beam is broken first gives an indication of wind direction.

Alternatively, the at least two parallel component sensor beams have the same wavelength, but are arranged to flash with different frequencies.

Each light source may comprise an optical fibre connected to an opto-electronic light source, wherein the opto-electronic light source is housed in an electrically shielded part of the wind turbine. This ensures that the sensor is resistant to lightning strikes.

Further, the light receiving device may be connected to a photo electric detector housed in an electrically shielded part of the wind turbine, and the light receiving device and its coupling to the photo electric detector are non-electrically sensitive. This ensures that the sensor is resistant to lightning strikes.

The optical fibre of each light source may be attached to the same opto-electronic light emitter, providing for economy of construction.

A corresponding method and computer program for controlling the wind turbine optical sensor are also provided.

BRIEF DESCRIPTION OF THE DRAWINGS

Preferred embodiments of the invention will now be described in more detail, by way of example, and with reference to the drawings in which.

DETAILED DESCRIPTION OF THE PREFERRED EMBODIMENTS

In general terms, an example embodiment of the invention comprises a wind turbine having an optical wind sensor. The sensor is housed within the wind turbine blade and is arranged to detect air flow directly in front of the blade. In an alternative example embodiment, the sensor can be housed in a mounting bar located on the rotor hub, or on the rotor hub itself. The data received from the sensor can be used in control processes for the operation of the wind turbine, such as for determining yaw or pitch angle, as well as for temporarily pitching the rotor blades in adverse wind conditions, particularly those where a vertical gust of wind is detected. Unlike systems involving LIDAR detection systems, the proposed system is relatively inexpensive to implement.

Additionally, the optical wind sensor utilises one or more sensor beams comprising at least two individual component beams of light pointing along the same sensor axis. The at least two parallel component sensor beams may have different wavelengths of light, allowing the sensor system to detect which of the light beams is triggered first when matter in the wind passes through the beam and reflects light back to a light collecting device.

First Embodiment

Figure 1:
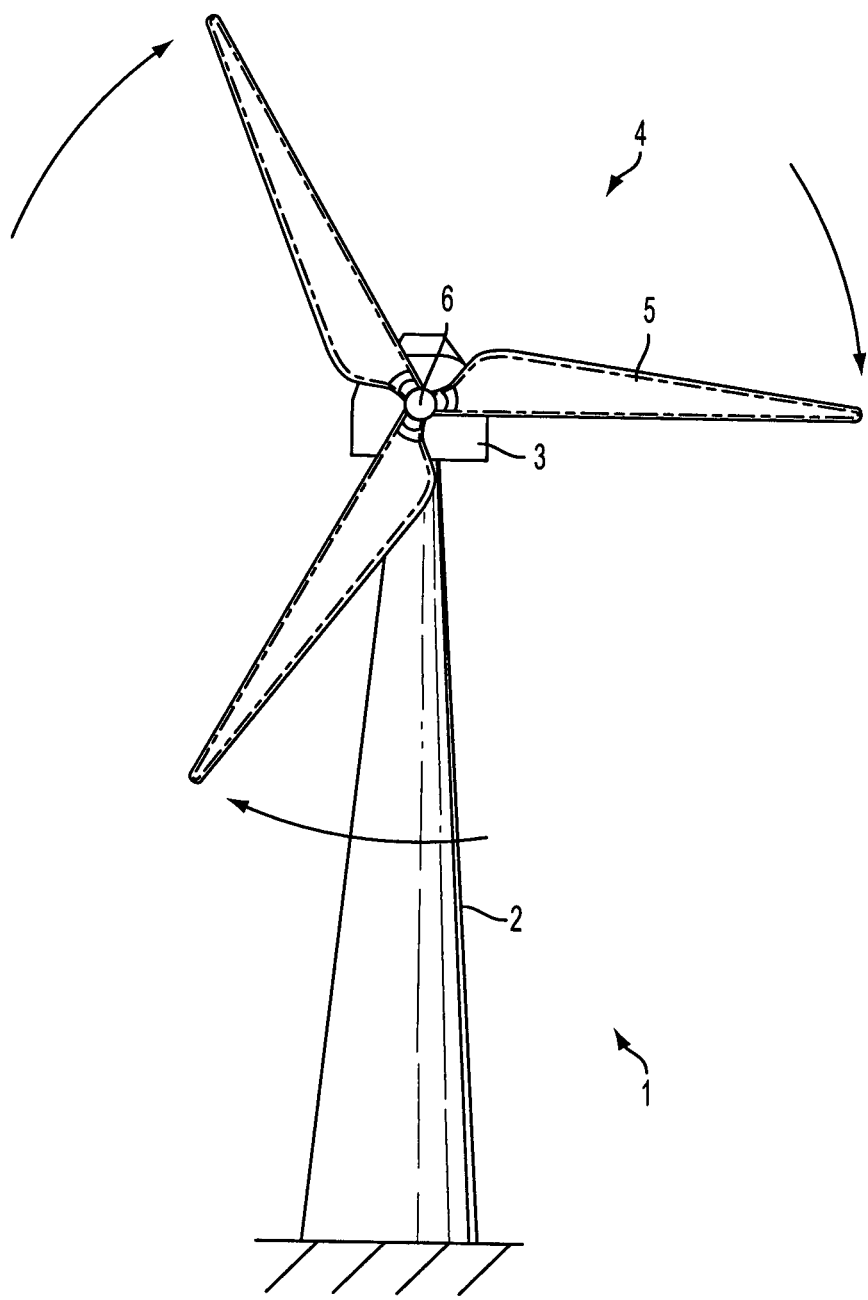
FIG. 1 is a schematic exterior view of a wind turbine.
Figure 2:
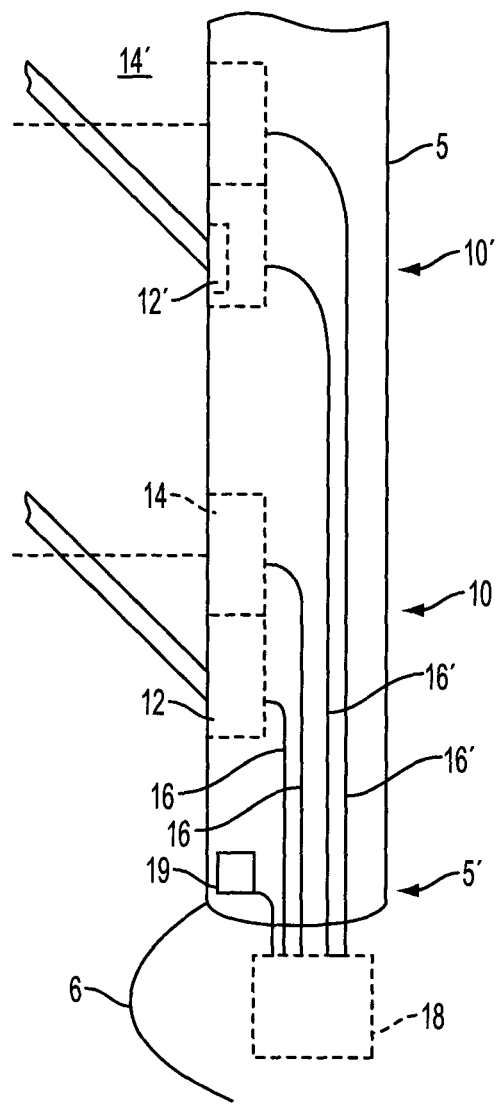
FIG. 2 is a schematic side elevation view of an optical wind turbine sensor according to a first example embodiment of the invention.
Figure 3:
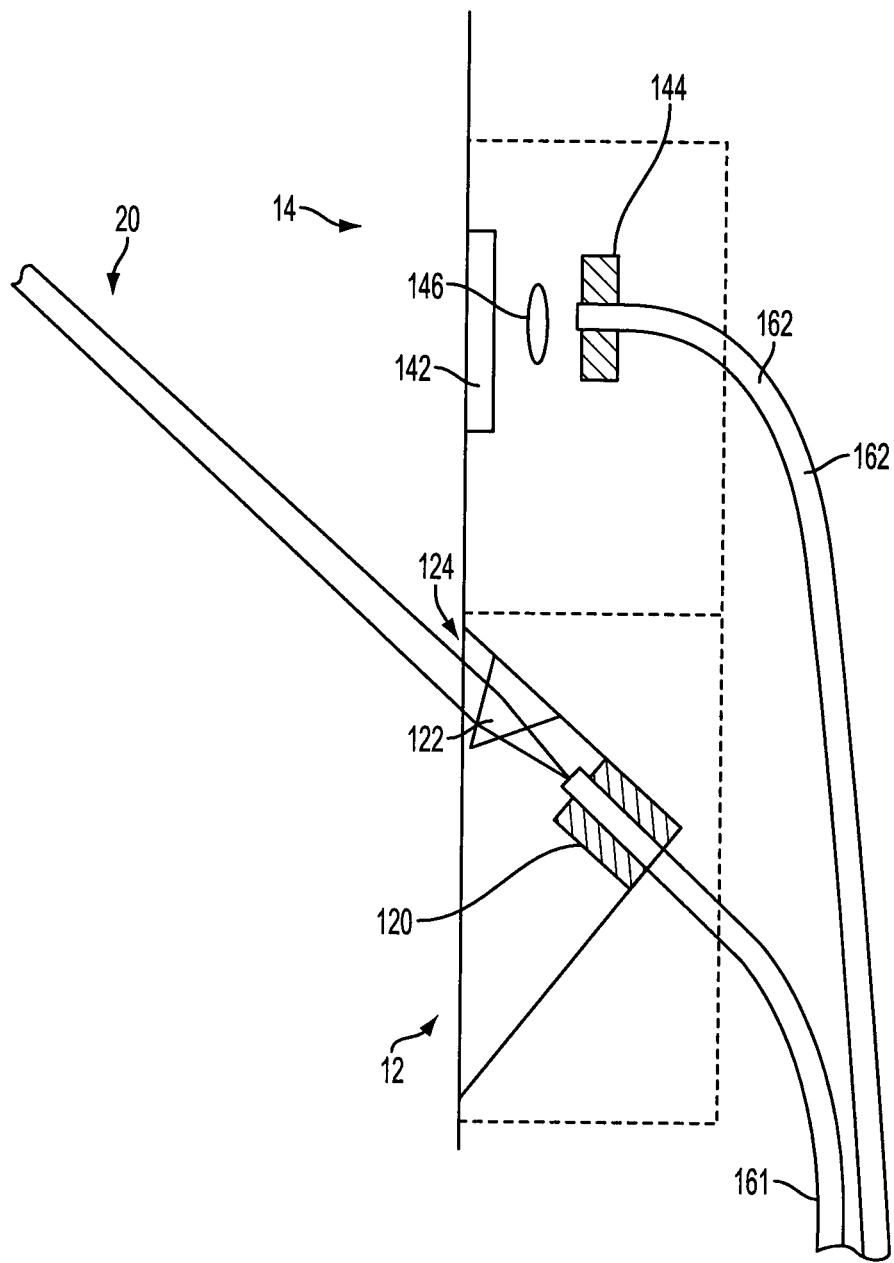
FIG. 3 is a detailed schematic view of the optical wind turbine sensor.
Figure 4:
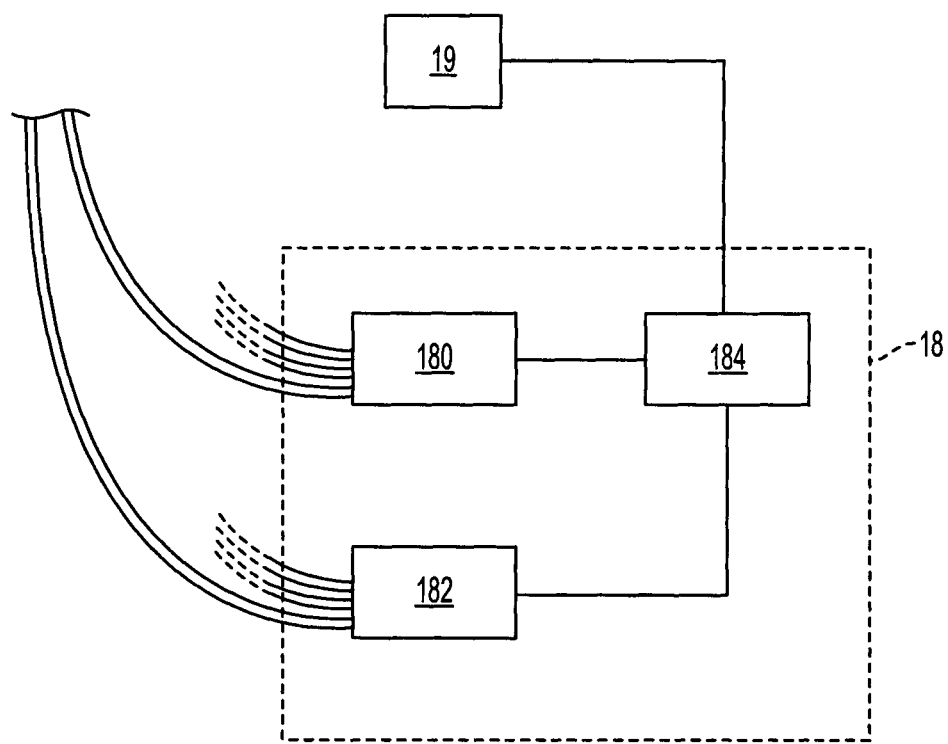
FIG. 4 is a schematic illustration of an opto-electronic suite used in the wind sensor of FIGS. 2 and 3.
Figure 5:
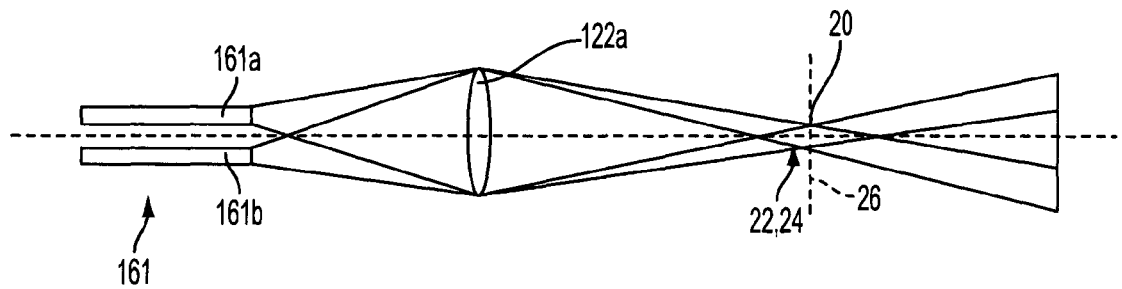
FIG. 5 is a simplified diagram of a first example of the light source shown in FIG. 3 in a first example.

Reference should now be made to FIGS. 2, 3 and 4 which illustrate a first example embodiment of the invention.

FIG. 2 is a side elevation view of an wind turbine optical wind sensor in which the detection apparatus is housed primarily in the blade. FIG. 2 shows the rotor hub 6 and a single blade 5 connected to the rotor hub 6 at a blade root portion 5'. In this illustration, blade 5 extends vertically in an upwards position, while the other blades positioned on the hub 6 have been omitted from the drawing for the sake of clarity.

The rotor blade 5 comprises a first optical wind sensor 10 housed in the interior of the blade 5, and comprising a light source 12 and a light receiving device or detector 14. These are located in the leading edge of the blade, or alternatively in the pressure or suction side of the blade near to the leading edge, so that the light from the light source can be projected in front of the blade into the oncoming wind. In other embodiments, the sensors can be built into fins and arranged across the blade surface in the chord wise direction, or to look upwind, arranged in a container attached or built-into the blade surface. The fins may be integral with the blade surface or attached to it. As will be appreciated the sensors could also be provided in containers of any suitable shape mounted on the wind turbine blade.

A second optical wind sensor 10' having corresponding light source 12' and a light receiving device 14' is also shown positioned further along the interior of the blade 5 from its attachment at the hub 6. Further optical wind sensors 10", 10''' (not shown) may be housed in the blade 5 and positioned along its longitudinal axis from the blade root to the blade tip, as desired. Sensors 10 are also be installed in the other rotor blades 5 that are not shown in FIG. 2.

The first 10 and second 10' optical wind sensors are connected to an opto-electronic equipment suite 18, shown here housed in the rotor hub 6, by optical fibres 16 and 16'. This allows a single equipment suite 18 to collect the data from respective optical wind sensors 10 housed in the various rotor blades 5. Alternatively, the opto-electronic equipment suite 18 may be housed in the nacelle 3, or in a distributed embodiment, be located in the rotor blades 5 with a central processor located in a location such as the hub 6 or nacelle 3 for ease of access.

Each blade 5 also preferably comprises an orientation sensor 19 connected to the controller 18. The orientation sensor 19 provides an indication of the direction in which the longitudinal axis of the blade, or the blade tip is pointing, in other words the angle between a fixed reference axis, such as the horizontal or vertical, and a line drawn from the root to the tip of the blade. In some embodiments, knowing the angular position of the blade 5 is advantageous, though not essential, for the controller 18 to make use of the data received from the optical wind sensors 10 and 10' as will be described below.

As a number of different orientation sensors are known in the art, the operation of sensor 19 will not be described in detail here.

The optical wind sensor 10 will now be described in more detail with reference to FIGS. 3 and 4.

The optical fibres 16 connected to the first sensor 10 comprise separate fibres 161 and 162. One end of optical fibre 161 connects to an opto-electronic light source 180 housed in the opto-electronic equipment suite 18 (see FIG. 4), while the other end terminates near the blade surface in order to form the light emitting part of light source 12. The opto-electronic light source 180 can include one or more LEDs, lasers, halogen or metal halide source connected to the optical fibre 161.

The optical fibre 161 is held in place in the light source 12 by a mount 120 connected to the interior of the blade body. The light source 12 also comprises an optical element 122 arranged in front of the end of the optical fibre 161 for receiving light output from the optical fibre 161. The optical element 122 can comprise one or more of an optical prism or lens, as will be discussed in more detail in connection with the examples below. Opto-electronic light source 180 housed in the hub 6 therefore emits light into one end of the optical fibre 161, which then emerges at the light source 12. The light emitted from the end of the optical fibre 161 is separated into two beams by the optical element 122, and emerges via a hole or opening 124 in the blade surface. The arrangement of the optical fibre 161 in the mount 120, the optical prism and opening 124 causes the emitted light to be projected in front of the leading edge of the blade at an angle to the blade surface. In practice an angle of 30 to 60 degrees has been found to work well, though the angle could also be in the range 10 degrees to 80 degrees. As will be appreciated from the discussion below, sensors arranged at shallower angles will generally result in less variation of data transit times that are attributable to the incident wind angle, and the data will need more processing to extract the wind direction signal.

The light receiving device 14 preferably comprises a collecting lens 142 and associated optical fibre 162. The collecting lens 142 has a large aperture for capturing light, and in the example described herein, may have a size in the range of 1 to 5 cm. In other implementations, the size of the lens may be scaled appropriately.

The optical fibre 162 is fixed inside the blade 5 by a mount 144, positioning the optical fibre 162 so that it can receive light collected by the lens 142. An additional focussing lens 146 can be provided between the collecting lens 142 and the end of the optical fibre 162 to increase the proportion of the light captured by the optical fibre 162. The optical fibre 162 is coupled to a light detector 182 in the opto-electronics suite 18.

The opto-electronics suite 18 will now be described in more detail with reference to FIG. 4. The opto-electronic equipment suite 18 comprises one or more opto-electronic light emitting devices 180, and one or more light detecting devices 182. The number of respective sources 180 and detectors 182 can be tailored to suit the number of optical sensors 10 mounted in the blades 5. A single emitter and detector may be used for all sensors 10, for each respective blade, or for each individual sensor. As will be evident from the discussion below, in some embodiments the opto-electronic light source 180 is configured to output light at at least two wavelengths into the optical fibre 161 for emission at the blade surface.

A controller 184 is connected to the light emitting device 180, the light detecting device 182, and the blade orientation sensor 19, and includes a memory and a processor on which control software is stored to control the plurality of optical wind sensors 10, and analyse the results.

The operation of the first wind sensor will now be described in more detail with reference to FIGS. 5 to 13. In this embodiment, each of the sensors operates in the same way.

In the example shown in FIGS. 2 and 3, each light source 12 outputs light at two distinct wavelengths. This is illustrated schematically in FIG. 5 by the two optical fibres 161$a$ and 161$b$, that are substantially aligned with one another, and which emit a beam of light substantially in the same direction. Of course, it is not necessary to have each light beam produced by a separate optical fibre, and an example using only a single fibre per light source 161 (as illustrated above) will be described below.

The two beams of light, having respective wavelengths $\lambda 1$ and $\lambda 2$, are directed onto the optical element 122, in this case a lens 122$a$, which focuses each beam at a focal region 20, some distance in front of the light collecting lens 142 of the light detector 14. A typical distance is 10 to 30 cm. In this example, the diameter of the focal point 20 of the beams is in the range 5 mm to 20 mm.

Within the focal region 20, each beam has a separate focal point 22 and 24. The focal points 22 and 24 are made to fall along the sensor axis 26, with a prescribed separation between each focal point. The separation can for example be in the range 0.1 mm to 10 mm.

Despite the fact that the two component beams of light are focussed, at focal region 20, they shall be referred to as parallel beams for the purposes of this discussion. This is intended to emphasise the fact that the two beams are individual components of a single composite sensor beam, and therefore point in substantially the same direction and act together to detect the transit of particulate matter. It will be appreciated for example that the effect of focussing the beams is solely to aid detection at the light receiving device 14, and that the focussing apparatus 122a could be omitted if this was not detrimental to operation. In this case, the unfocussed component beams could be truly parallel, although the detection at the light receiving device would not then be as easy to carry out. In embodiments described later, it is not necessary to focus the beams and the beams may be parallel in a more strict sense.

The wind sensor operates by detecting flashes of light from each sensor beam, as particles of matter carried in the wind, pass through the focal region 20 and reflect the light from each beam towards the lens 142. Air, of normal quality, typically comprises a sufficient quantity of such matter for the transit of particles to be detectable, providing a suitable wavelength of the light is chosen. Particles of water vapour, dust or pollen can easily be detected in this way.

Figure 6:
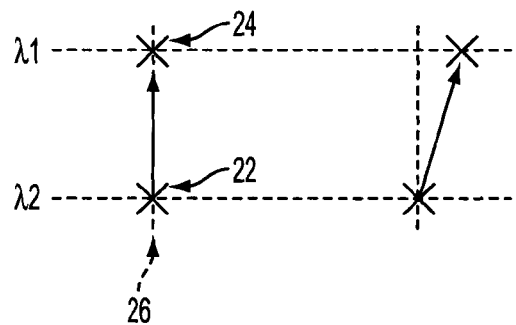
FIG. 6 is a first diagram illustrating a detection principle.

FIG. 6 illustrates the principle in more detail. The left hand side of FIG. 6 illustrates the flash of light (denoted by an X) at each beam's focal point 22 and 24, occurring as a particle in the air travels along the sensor axis 26 in this case in the upwards direction. Assuming that the separation between the two beam focal points 22 and 24 is a few mm, then the flash at focal point 22 will occur marginally before the flash at focal point 24. Assuming that the wind speed is a few tens of meters per second, the time between flashes may be very low, e.g parts of a second. This transit time ultimately needs to be measured if the speed of the particle, and the wind in which it is carried, is to be understood.

The transit time can be measured with two beams having the same wavelength. However, it is advantageous if the beams have different wavelengths as this facilitates detection, and provides information about the direction of particle transit. This will now be discussed in more detail.

If the light of each beam were to have the same frequency or wavelength, then in practical terms the only information available from the light flashes would be the time of transit. It might be possible to attempt to detect which beam is triggered first, and therefore deduce the direction in which the particle is moving, but this requires high resolution equipment and processing, leading ultimately to more cost.

These difficulties are alleviated in the present example of the invention by the use of beams of different wavelengths. The different wavelengths allow the processing equipment to determine which beam is triggered first, not by a visual analysis of the spatial position at which the flash originated, but based on the wavelength of the flash, and the order in which the flashes occur. For a particle moving from top to bottom as in the example of FIG. 6, the sensor will therefore see two flashes of wavelengths $\lambda 1$ and $\lambda 2$ and may deduce the direction of travel from the order $\lambda 2$, $\lambda 1$.

Figure 7:
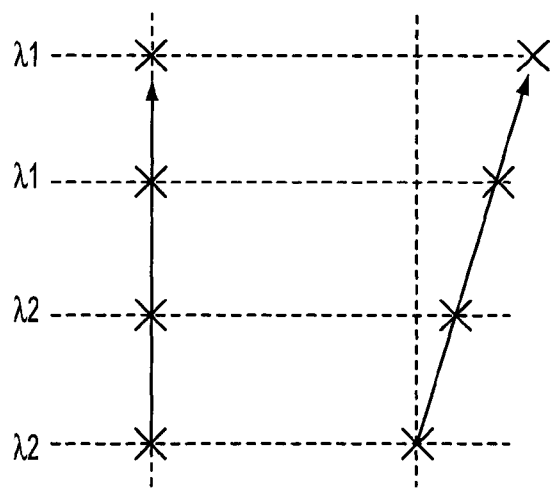
FIG. 7 is a second diagram illustrating a detection principle.

A slight modification to the example is shown in FIG. 7, in which third and fourth beams are also used for detection. In this example, the additional beams have the same wavelength as the first and second beams, and may therefore be generated by one or more beam splitters incorporated in the optical elements 122 coupled to the optical fibres 161.

The advantage of using four beams is that the transit of a particle is then indicated by four flashes of different wavelengths that occur at equally spaced intervals in time. This makes the signal for a particle transit stronger than the case of just two flashes, and therefore easier to distinguish from background noise. For example, if one of the flashes of reflected light in the four is not as strong as the others, the presence of the flashes either before or after (providing these occur at the correct timing), allows particle transit to be detected with some certainty despite the missing or weakened individual flash. With just two flashes, the absence of a strong signal for even just one of the flashes can introduce a great deal of uncertainty into the detection.

Furthermore, the use of four beams increases the distance that the particle has to travel, increasing its transit time, and therefore improving the accuracy in the measurement of particle speed. The order in which the beams are arranged is not consequential, providing the arrangement is not symmetric and can so be used to determine direction. Having said that, grouping the beams together by wavelength is preferred, such as $\lambda 1$, $\lambda 1$, $\lambda 2$, $\lambda 2$, as shown in the FIG., as it makes the directional part of the resulting signal stronger. Of course, any number of beams may be used in the sensor, as desired.

The wavelengths of the beams also provides a better signal to noise ratio for the sensor signals, as separate particle transits can be more easily distinguished from one another. This is because each transit event will be represented as two flashes of light of different wavelengths close together in time. The pair of flashes therefore mark an opening and a closing for each transit event. Without this distinction, all that would be detected is a pair of light flashes of amidst a background of other flashes. The pairs of flashes representing a transit event must then be distinguished from each other simply on the basis of timing (that is the time between two flashes in a pair being shorter than the time between two flashes in adjacent pairs).

Figure 8:
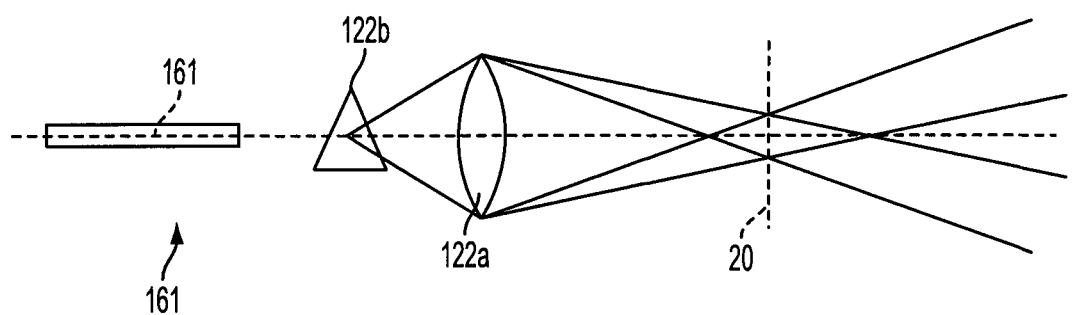
FIG. 8 is a simplified diagram of the light source apparatus shown in FIG. 4 in a second example.

FIG. 8 illustrates a second example of light source apparatus, which is advantageous where a number of light beams with different wavelengths are to be used in the sensor. The light source comprises a single optical fibre 161 connected to the opto-electronic light source 180 as before. A plurality of different beams of light, each with a different wavelength, are input into the optical fibre and are transmitted along its length as a composite beam. On emerging from the optical fibre 161, the composite beam is directed at an optical prism 122b, included in optical element 122, which splits the beam into a separate beam for each of its respective component wavelengths. The optical prism 122b directs the individual beams onto the optical lens 122a as before. Using this arrangement, any number of beams of different wavelength may easily be used in the sensor.

The processing of the signals from the sensors 10 by controller 184 will now be described in more detail.

The controller 184 periodically queries the optical wind sensors 10 on each blade and the orientation sensor 19 and so associates each transit time reading of a particle traversing the sensor beams with a particular blade 5, and with a value indicating the orientation of the blade at the moment the reading was taken. In this way, as each blade 5 rotates around the rotor hub 6 different sensor readings will be continuously collected and stored for each angle of rotation. Although this process occurs for the sensors on each of the three blades 5 at the same time, the querying process can be in parallel, with all sensors 10 transmitting back to the controller 184 simultaneously, or in series, with the controller 184 querying each sensor in turn.

For simplicity, we shall now imagine a case, where the wind approaches the wind turbine rotor 6 in a head-on direction (from left to right in the plane of the page of FIG. 2), and furthermore that the three wind turbine blades are stationary. Although the sensor beams from the light sources 12 are angled with respect to the leading edge of the blade, it will be appreciated that the when the blades 5 are viewed from the head-on direction (from in front of the rotor hub 6), the sensor beams will appear to be parallel to the direction in which the blades extend from the hub 6, (and in the example of FIG. 2) pointing slightly outwards from the hub (though equally they could point inwards). In the plane of the rotor, therefore, the sensor beams produced by sensors 10, 10' etc in one blade 5 are angled at 120 degrees to the sensor beams of a second sensor in a second rotor blade (assuming three equally spaced blades).

Figure 9:
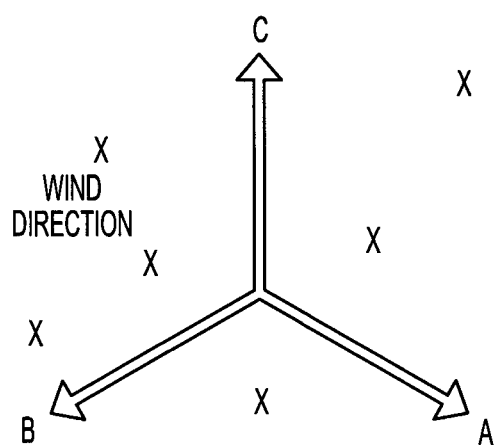
FIG. 9 is a simplified diagram illustrating the direction of the beams when viewed from the front of the rotor plane.

In the plane of the rotor, the situation will therefore be as illustrated in FIG. 9, three sensor beam directions corresponding to an angular separation of 120 degrees. The beams will actually come out of the page (due to the angle at which the optical fibres are installed in the blades) forming a shallow cone in front of the rotor blade. The main purpose of the cone is to locate the focal point 20 for detected the particle slightly in front of the blades 5, so that the scatted light can be detected by the light receiving device 14 installed in the blade.

Figure 10A:
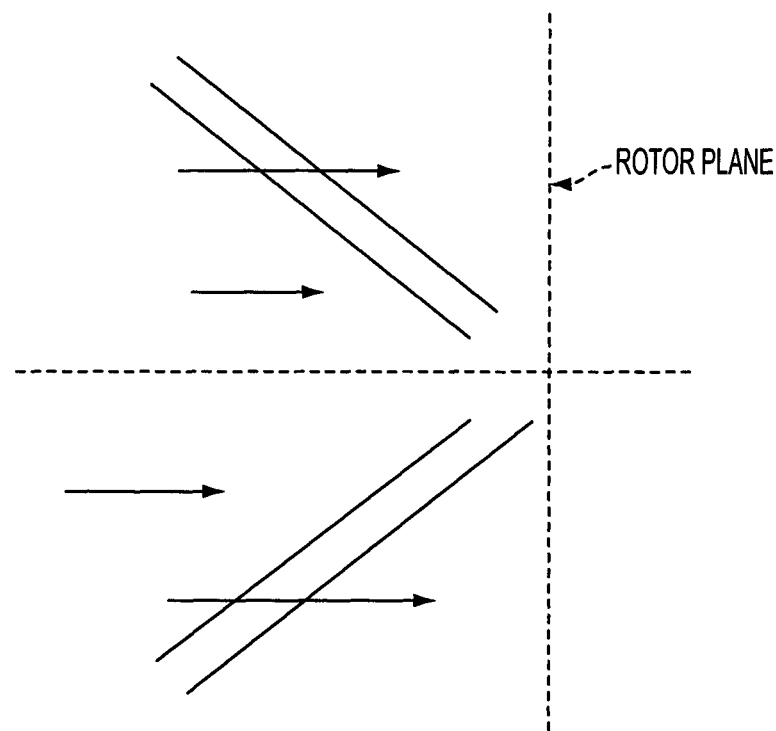
FIGS. 10A and 10B illustrate the arrangement of the sensor beams in an example embodiment of the invention.

As shown in FIG. 10, the fact that the sensors beams are angled with respect to the rotor plane, allows the sensor system to detect whether the wind approaches the rotor blade perpendicular to the angle of the rotor plane, or at an angle. FIG. 10A shows the case in which the wind approaches perpendicularly to the rotor blade, and crosses the sensor beams of at least two of the rotor blades 5 (the sensor beams from the two blades are shown in the top and bottom halves with the rotor hub omitted). In this case, the angle of the sensor beams with respect to the vertical, or with respect to the rotor plane is assumed to be 45 degrees.

The distance travelled by particulate matter in the wind through each of the blade beams is the same when the wind blows horizontally due to the rotational symmetry of the blade orientation. This will be true regardless of the orientation of the individual blades 5, and of the beams. The time of respective particulate transit events, indicated by the time that elapses between the flashes of different wavelength light detected at the sensor 10, will therefore be broadly the same for each blade irrespective of blade orientation.

Figure 10B:
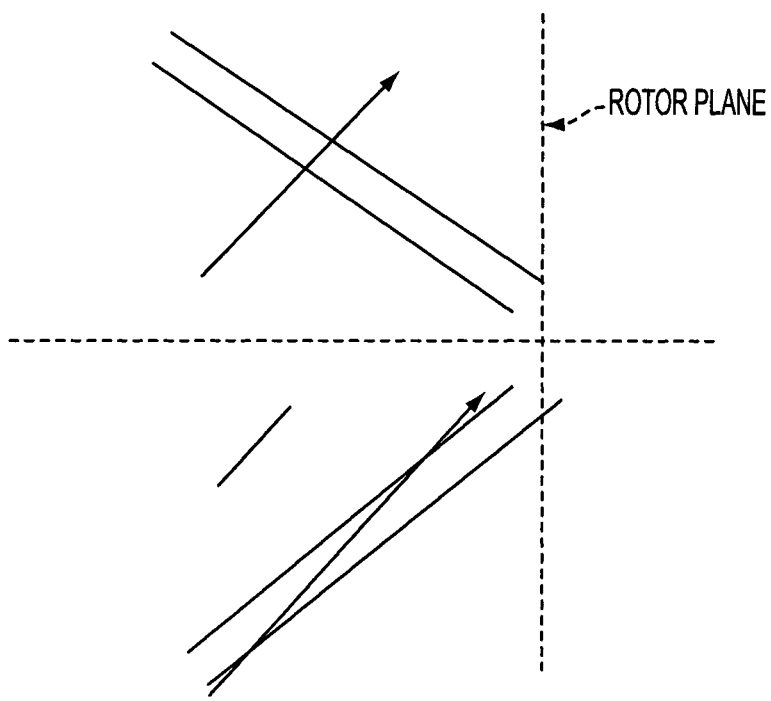

In FIG. 10B however, a situation is illustrated where the wind direction is not perpendicular to the rotor plane, but angled. In this situation, the distance travelled by particular matter in the sensor beams is very different. The transmit path through the top sensor beam will be short (as the transit is perpendicular to the beam direction), while the transit time for the bottom beam will be much longer, if it is even detectable as a transit event (it will not be detectable where the particulate matter passes though the focal point axes 26a perpendicularly and the parallel sensor beams are not duly triggered in sequence).

The time of respective particulate transit events, indicated by the time that elapses between the flashes of different wavelengthed light that are detected at the sensor 10, will therefore be widely different for each of the blades 5, depending on the orientation of the blade with respect to the hub. This difference in transit time indicates that the wind is approaching the wind turbine blade at an angle that is not perpendicular to the rotor plane, but is at an angle to it.

As a result, a comparison of transit times for particulate matter crossing the sensor beams of different blades is used to give an indication of the vertical component of the wind speed, namely the component that is parallel to the plane of rotation of the rotor blades or orthogonal to the axis of rotation of the rotor. Similar values of transit times indicate that there is no significant vertical component, while different times indicate a significant vertical component, and possible danger for the rotor.

Figure 11A:
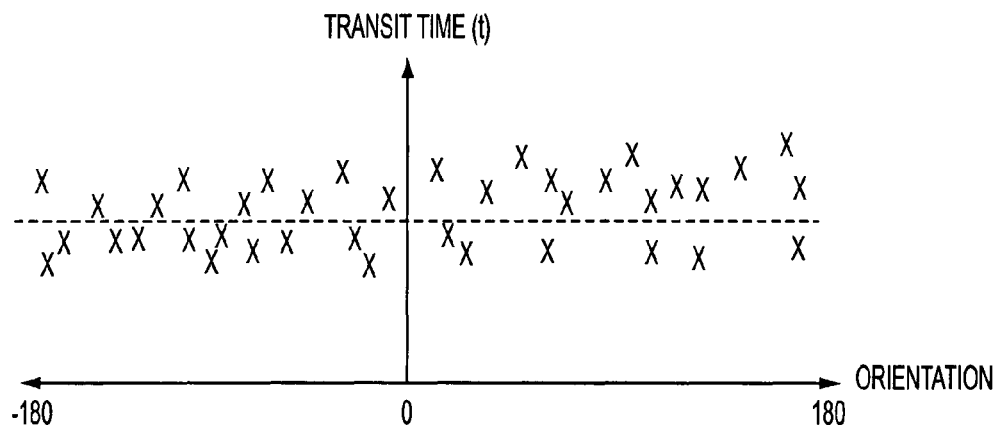
FIGS. 11A, 11B and 11C schematically illustrate the data collected for from the sensor in a first and second embodiment.

The controller 184 therefore monitors the transmit time signals being received from the sensors installed on the different rotor blades 5, and determines an indication of the vertical wind component from the transit time distribution. FIGS. 11A, B and C illustrate the different distributions for the situations described above. In FIG. 11A, the transit times are collected from each sensor 10 and from each blade 5 and can be plotted on a graph against blade orientation as shown. For the purposes of illustration, an orientation of zero degrees is assumed to correspond with the case where the wind turbine blade 5 is pointing directly upwards.

Figure 11B:
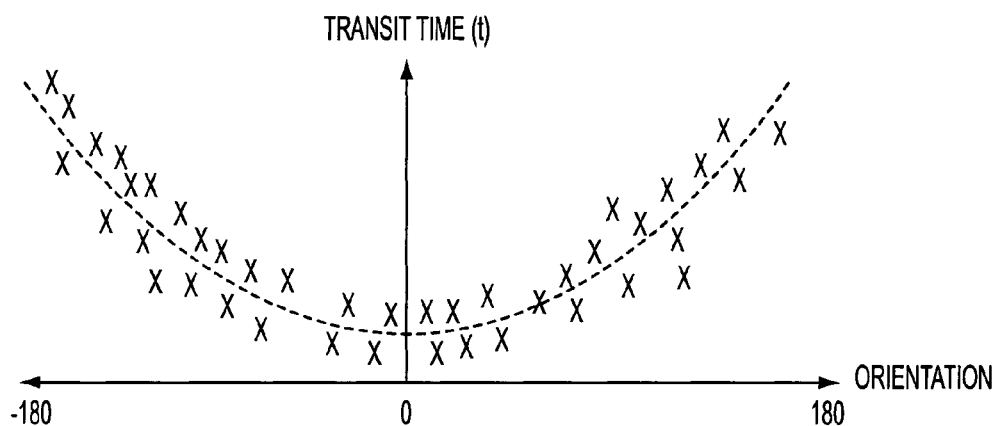

A flat distribution indicated in FIG. 11A indicates that the wind direction is largely perpendicular to the rotor plane, or parallel to the axis of rotation. FIG. 11B on the other hand illustrates the situation where the wind is angled to the rotor plane, and blows in an upwards direction, (as in FIG. 10B) that is the wind does not meet the wind turbine rotor head-on, but comes up from underneath the hub. In this situation, the transit times indicated by the sensors 10 on the blade 5 when it is in the vertically upwards position are small (smaller than for FIG. 11A) as the wind direction follows or approaches a line perpendicular to the sensor beam direction, thereby cutting the sensor beam with the shortest path. The transit times for the sensors on the blades 5 at other orientations is however longer, as the sensor beam move out of an angle perpendicular to the wind direction and into a direction parallel to the wind direction. When the blade is pointing vertically downwards (with an orientation of plus or minus 180 degrees) the transit time is essentially infinite, or in practice undetectable.

Figure 11C:
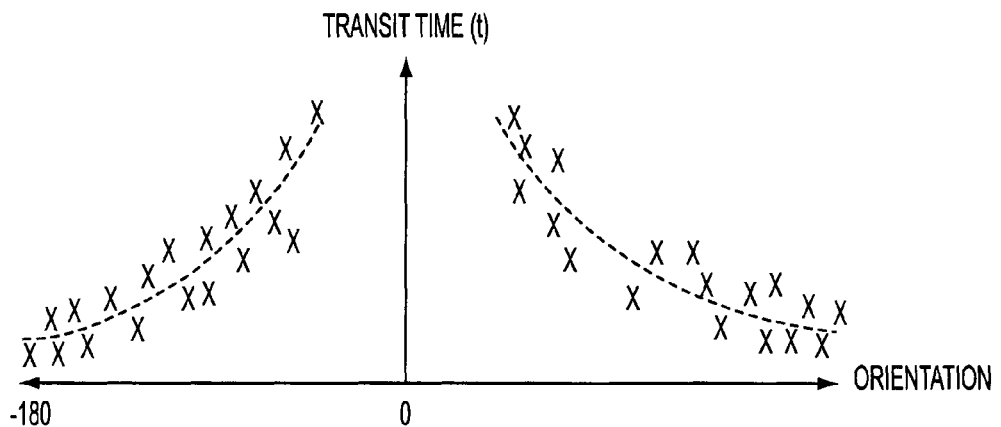

If the wind were to come from the opposite direction to that shown in FIG. 10B, that is from the top of the wind turbine hub and angled downwards, then the distribution of transit times would look like that shown in FIG. 11C.

As discussed above, the controller 184 uses the transit time information to determine the direction of the wind with respect to the vertical axis. Wind gusts in this direction can be problematic as they can damage the wind turbine and the wind turbine blades. By detecting when the wind is blowing off the horizontal axis (FIG. 10A), having a significant component in the vertical direction, the controller can issue an alarm signal, and cause the wind turbine to take measures to protect itself, such as adjusting the blade pitch to spill the wind, or another way of lowering the production output and hence e.g. the loads on the turbine.

Changes in wind direction can occur very quickly, over a period of time ranging from less than a second to a few seconds. The rotation speed of the wind turbine blades is much slower than these variations, approximately 5 to 20 times per minute. Although it would take a blade at least three seconds to make a complete revolution, it takes three blades only 1 second (at high rotational speeds) to sweep through the full 360 degrees of the rotor. For this reason, it is advantageous in practice, if the controller 184 bases its analysis on transit times that are continuously collected from the blades 5.

In addition to this detection technique, the controller can collect 184 and analyse the transit time data, collected over a longer period of time to obtain average wind direction data. This will not detect wind gusts that could cause the wind turbine to become damaged, but would indicate for any given wind turbine whether there is a tendency for the wind to meet the rotor from directions that lie away from the horizontal axis, and would therefore indicate whether the wind turbine is likely to be put under significant strain that could reduce its operation life. Such information from the controller 184 could then be transmitted to the wind park or utility operator for analysis and logging.

The operation of the controller 184 to detect off-horizontal axis wind directions can be implemented with only a single sensor 10 per wind turbine blade 5, as discussed below in the alternative embodiments, or with a plurality of sensors 10 per blade. Having a plurality of sensors arranged along the longitudinal axis of the blade does however allow the controller 184 to detect the vertical wind component at different radii measured from the hub over the entire sweep of the rotor. This allows the controller's alarm indication, where strong vertically orientated wind directions are detected, to be more sensitive. For example, strong vertical components of wind detected near the blade root and hub 6 are less likely to be problematic than strong vertical components of wind near the blade tip, where the blade is aerodynamically shaped and more flexible, and may strike the tower if it deforms too much.

Further, although in the above example, the transit time events of particulate matter breaking the beams is recorded by the controller with the respective orientation of the sensor beams (either on the blade or later on the hub as will be described with reference to the second embodiment), the detection of orientation is not necessary and in alternative embodiments can be omitted. Even without the orientation sensor information, it will be apparent that the graphs illustrated in FIG. 11 can be generated as a time series of data received from each sensor, and will generally show a periodicity as the sensor beams rotate. The controller can therefore still use this information in its comparison of the sensor beam data and detect a yaw error being present. The use of the orientation sensor 19 is however typically preferred as it allows relatively instantaneous operation of the sensor without it being necessary to accumulate data over an extended period of time.

Further example embodiments of the invention will now be described with reference to FIGS. 12 and 13.

Second Embodiment

Figure 12:
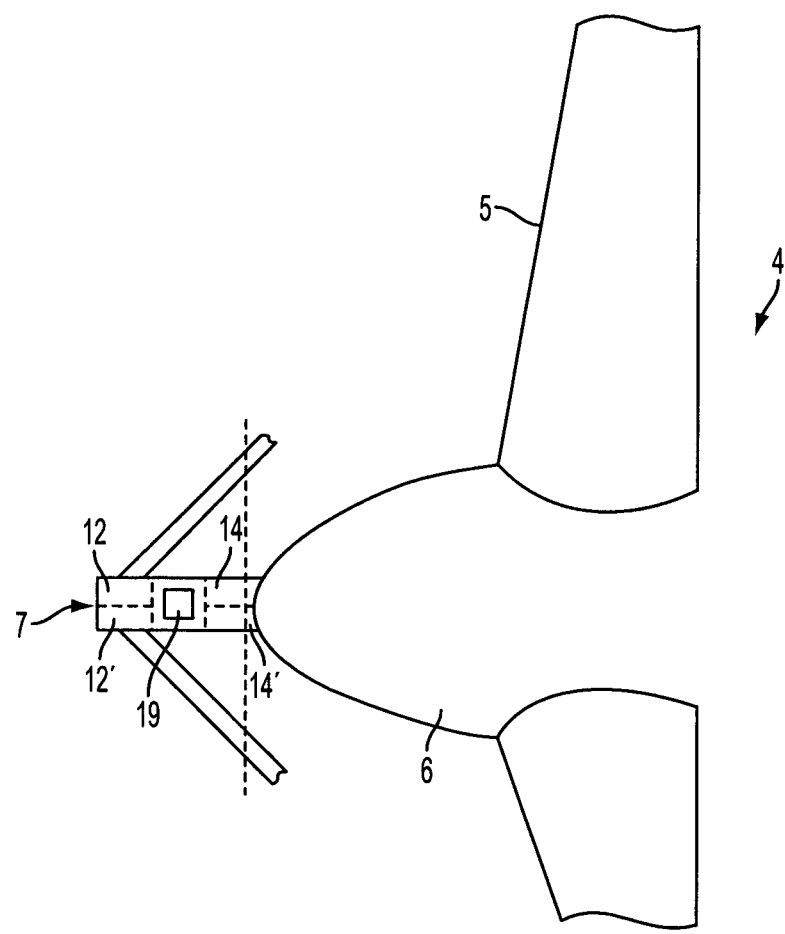
FIG. 12 illustrates a second example embodiment of the invention.

FIG. 12 illustrates an example of the invention in which the light emitters 12 and light detectors 14 are mounted in a bar 7 connected to hub 6. The bar is mounted on the front of the hub so that, as the hub 6 rotates, the bar 7 rotates coaxially and around its longitudinal axis, and the rotational axis of the rotor 4. The plurality of light emitters 12 are located in the bar and emit respective pairs of component sensor beams away from the bar and at an angle to its longitudinal axis forming a cone. The cone may extend towards or away from the rotor blades 5. The light emitters 12 are located around the circumference of the bar and so emit the sensor beams at different angles in the rotor plane. As shown before for FIG. 9, there may be three light emitters located around the circumference of the bar, in which case the sensor beams are arranged at 120 degrees to each other. In this example, as the location of the light emitters 12 and light receiving devices 14 is not limited by the number of rotor blades 5, however, any number of sensor beams, such as four sensor beams with an angle of 90 degrees between them, can be provided.

A plurality of light receiving devices 14 are also located in the bar 7 to detect light scattered from particulate matter passing through the sensor beams, while an orientation sensor 19 located in the bar also indicates for each light emitter 12 and light receiving device 14, the orientation of the emitter-receiver pair. It will be appreciated that any of the light emitters 12, light receiver 14 and orientation sensor 19 could also be provided on the rotor hub 6, rather than the bar 7.

In order to ensure operation in all conditions, a heating element (not shown) can be provided in the rotor hub 6 or in the bar 7 to melt any ice that has accumulated. Furthermore, a hollow, open-ended cover or sheath enclosing the light emitters 12 and detectors 14 could also be provided in order to prevent the build-up of dirt or other matter. The heating element is preferably not electrically conductive and made of a durable material.

The bar 7 may be constructed from a material such as plastic with fibre reinforcements of fibreglass or carbon. Other non conductive, environmentally resistant materials could also be used. Similarly, the cover can be constructed from the same materials, or from lighter deformable materials such as a polymer, e.g. rubber, natural rubber, polypropylene, polyethylene, nylon, elastomers, kevlar, or the like.

In this embodiment, the operation of the optical sensor system is identical to that described above for the first embodiment, except that the physical location of the light sources 12 and light receiving devices 14 is on the rotor hub 6 rather than the blades. In an alternative embodiment, the sensors 10 may be built into a winglet positioned on the hub, and arranged to look inwardly along the blade surface.

The sensor system of this embodiment is not susceptible to movements of the blades, or to changes in the pitch of the blade. However, unlike the first embodiment, it cannot give an indication of the vertical component across the whole radius of the rotor 4. This embodiment may be used in conjunction with the first embodiment or separately.

Third Embodiment

Figure 13:
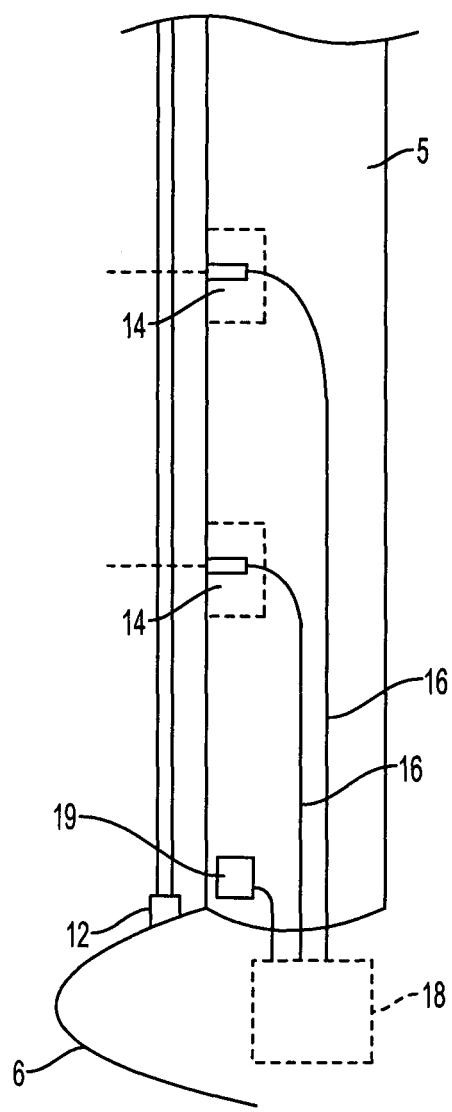
FIG. 13 illustrates a second example embodiment of the invention.

FIG. 13 illustrates a further embodiment, in which the light emitters 12 are located in the rotor hub 6, and the light receiving devices 14 are located in the wind turbine blades 5. The light sources 12 are arranged so that they emit the two sensor beams in a direction parallel to the rotor plane and in front of the rotor blade 5. The light emitters 12 in this example implementation are more powerful, and may comprise a laser device, than in the examples described above as the beams they emit must travel along the length of the rotor blade 5 along which the light detectors 14 are situated. For this reason, the individual component beams are not focussed but are arranged to be parallel to one another along the length of the blade. The beams can of course be focussed if only a single light receiving device 14 is located on the blades 5, and the beams are to cooperate with the devices 14.

As in this embodiment the beams are not angled with respect to the blade and it is not possible to determine whether the wind is approaching the wind turbine rotor from below or from above in the manner described earlier for FIG. 11. The embodiment does however provide an advantageous anemometer arrangement, in which the transit time of particulate matter passing the beams is used to give an indication of the wind speed at the rotor (assuming that the wind direction is largely horizontal to the rotor plane). As the wind speed is detected in front of the rotor blades, this gives a reading that is closer to the free stream wind speed than where the anemometer is located on the top of the wind turbine nacelle. For the anemometer to operate correctly is it is necessary therefore to ensure that the wind turbine rotor is facing into the winds. Methods and apparatus for achieving this are well known in the art, and so shall not be described here.

In order to compensate for changes in the pitch of the rotor blades 5 during operation, the light emitter and the detector may need to have a wide/flat characteristic like oval having a focal extent in order that the detector may detect the light even when the blade is pitched, at least a few degrees.

This embodiment may be used in conjunction with either or both of the first and second embodiments, or separately.

In all three embodiments, it will be understood that the sensor beams have a beam component orthogonal to the rotational axis of the rotor, and parallel to the rotor plane.

In the examples of the invention described above, the optical wavelength or frequency of the light is used to distinguish one individual sensor beam from another and subsequently provide information concerning the transit direction of the wind. In a further alternative embodiment, the wavelength of the individual beams can be constant, but the beams can be caused to blink on and off and subsequently be distinguished from one another, by their blink frequency.

In order to ensure that particles in the wind are detectable, that is that they do not pass through the beam while the beam is off, the blink frequency should be set sufficiently high. As the wind speed of interest may be of the order of tens of meters per second, and the beam width is of the order of millimeters, the time the particles in the wind may spend in the beam may be less than 50 micro seconds. The blink frequency of the light will therefore need to be of the order of 1 MHz or greater to ensure that the particle transmit can be imaged. Frequencies above 100 MHz may be useful in practice.

At the detector, which in this case may be a single PIN diode for example, the received light from the respective individual beams will add together depending on which of the beams the particle is intersecting and when. However, the sensor signal from each individual beam will have its own signature dependent on its individual blink frequency, allowing the signal from a particular beam to be isolated from the others using filtering. Such filtering may be achieved using traditional band pass filters or more complicated digital optical electronics. When choosing the frequencies of the individual beams care should be taken to avoid harmonics that could disturb the detection, such as when one beam has a frequency that is a multiple of another. By way of example, suitable frequencies in the over 100 MHz range could be 110, 120, 130, 140, 150, 160, 170, 180, 190, 210, 230, 250, 270, 290 MHZ and so on. This allows all of the beams to operate continuously, but still allows individual beams to be detected.

The optical wind sensor described above can be used in systems controlling the operation of the wind turbine, such as pitch and yaw control systems, as well as for providing data used in calculating the power curve for the turbine.

Moreover, the wind sensor may be used for detecting a vertical wind direction component. By component is meant, that the wind direction is vectorised and having three components, one being parallel to the axis of rotation of the rotor and two being perpendicular to said component, one such component may be an essentially vertical component, and the speed of the wind exceeds a predetermined threshold, the turbine operation is downrated or stopped. Such a situation may correspond to e.g. when a serious yaw error is present, but instead of one side of the rotor (left to right or right to left, when seen in a front view of the turbine) being more into the wind than the other, it will be a lower side or higher side of the rotor being more into the wind. Typically, the vertical component, such as in mountain sites, may be upwards away from the ground and may increase the load on the lower side of the rotor compared to the higher side. Hence, an unwanted skewed loading situation may be present, whereby dependent on the actual turbine and site specific issues, a threshold may be set for downrating (lowering power output, but maintaining the turbine operative) or stopping the turbine may be preferred.

The lens and optical elements described in the example embodiments above can be conventional optical devices, or holographic, or multidirectional optics if preferred.

For the purposes of illustration, the invention has been described with reference to a number of examples. The invention is not to be limited to these, and variations will be apparent to the skilled person within the definition provided the by the claims. For example, although only three wind turbine blades have been described, other numbers of blades are possible. The embodiments of the invention could also be adapted to vertical axis wind turbines where appropriate.

The invention claimed is:

1. A wind turbine optical wind sensor, comprising:
a plurality of light sources mounted on the rotor of a wind turbine, such that in use the light sources rotate around the rotational axis of the rotor, wherein each light source is positioned to emit a sensor beam having at least a first directional beam component orthogonal to the rotational axis of the rotor, and wherein each sensor beam is made up of at least two parallel or substantially parallel component sensor beams;
a plurality of light receiving devices mounted on the rotor, and wherein the plurality of light receiving devices are positioned such that each sensor beam is associated with at least a first respective light receiving device to detect at least two flashes of light resulting from particulate matter in the wind respectively passing through focal points of the at least two parallel or substantially parallel component sensor beams;
a controller, coupled to the plurality of light receiving devices, that determines transit times each as respective elapsed times between the detected at least two flashes for the particulate matter to pass between the focal points, and determines one or more of the speed and direction of motion of the particulate matter based on the determined transit times.

2. The sensor of claim 1, wherein at least two of the sensor beams have second directional beam components that are parallel to the rotational axis of the rotor; and wherein the controller is configured to:
compare the respective transit times for each sensor beam; and
determine an indication of a vertical velocity component for the wind direction.

3. The sensor of claim 2, wherein controller is configured to: determine whether the indication of the vertical velocity component of the wind is above a threshold level, and if it is, issue an alarm signal.

4. The sensor of claim 2, wherein controller is configured to: determine whether the indication of the vertical velocity component of the wind is above a threshold level, and if it is, to pitch the rotor blades to spill the wind.

5. The sensor of claim 2, wherein the controller is configured to operate an orientation sensor for determining the orientation of the hub, or of one or more of the rotor blades, and wherein the controller records for each detected transit time the orientation of the sensor beams where the at least two flashes were detected.

6. The sensor of claim 2, wherein the light sources are mounted on the rotor blades, such that the sensor beam projects both in the longitudinal direction of the rotor blade and in front of the rotor blade; and
wherein the light detectors are located on the rotor blades, adjacent to respective light sources and positioned to detect flashes of light from particulate matter in the wind that passes through the at least two component sensor beams.

7. The sensor of claim 6, wherein the sensor beams project in front of the rotor blades, at an angle of between 10 and 80 degrees to the horizontal axis.

8. The sensor of claim 7, wherein the sensor beams project in front of the rotor blades, at an angle of between 30 and 60 degrees to the horizontal axis.

9. The sensor of claim 6, wherein a plurality of light sources and light detectors are located on each rotor blade.

10. The sensor of claim 1, wherein the light sources are mounted on a rotor hub or near or at a blade tip end of one or more rotor blades.

11. The sensor of claim 10, wherein one or more of the light sources and the light detectors are mounted on a bar protruding from the rotor hub.

12. The sensor of claim 11, wherein the bar protrudes in front of the rotor hub, and is mounted for coaxial rotation with the axis of rotation of the rotor hub.

13. The sensor of claim 12, wherein the at least two sensor beams are arranged in a sequence around the axis of rotation.

14. The sensor of claim 2, wherein data indicating the vertical velocity component for the wind direction is collected over an extended period of time by the controller and transmitted to a wind park operator.

15. The sensor of claim 10, wherein the light sources are arranged on the rotor hub, such that the sensor beams are projected parallel to the rotor plane; and the light receiving devices are located in the rotor blades.

16. The sensor of claim 1, wherein the at least two substantially parallel component sensor beams have different wavelengths of light in comparison to one another.

17. The sensor of claim 16, where the different wavelengths are invisible to a human eye.

18. The sensor of claim 1, wherein the at least two parallel substantially parallel component sensor beams have the same wavelength, but are arranged to flash with different frequencies.

19. The sensor of claim 1, wherein each light source comprises an optical fibre connected to an opto-electronic light source, wherein the opto-electronic light source is housed in an electrically shielded part of the wind turbine.

20. The sensor of claim 1, wherein the light receiving device sensor is connected to a photo electric detector housed in an electrically shielded part of the wind turbine, and the light receiving device and its coupling to the photo electric detector are non-electrically sensitive.

21. The sensor of claim 19, wherein the optical fibre of each light source is attached to the same opto-electronic light emitter.

22. A wind turbine, comprising:
a rotor that rotates along a rotational axis;
an optical wind sensor comprising:
  a plurality of light sources mounted on the rotor of a wind turbine, such that in use the light sources rotate around the rotational axis of the rotor,
  wherein each light source is positioned to emit a sensor beam having at least a first directional beam component orthogonal to the rotational axis of the rotor, and wherein each sensor beam is made up of at least two parallel or substantially parallel component sensor beams;
  a plurality of light receiving devices mounted on the rotor, wherein the plurality of light receiving devices are positioned such that each sensor beam is associated with at least a first respective light receiving device to detect at least two flashes of light resulting from particulate matter in the wind respectively passing through focal points of the at least two parallel or substantially parallel component sensor beams; and
  a controller, coupled to the plurality of light receiving devices, that determines transit times each as respective elapsed times between the detected at least two flashes for the particulate matter to pass between the focal points, and determines one or more of the speed and direction of motion of the particulate matter based on the determined transit times.

23. A method of operating a wind turbine optical wind sensor to determine one or more of the speed and direction of the wind arriving at a wind turbine rotor, wherein the optical wind sensor comprises a plurality of light sources and light receiving devices mounted on the wind turbine rotor, such that the light sources and light receiving devices rotate around the rotational axis of the rotor; the method comprising:
emitting, from each light source, a sensor beam having at least a first directional beam component orthogonal to the rotational axis of the rotor, wherein each sensor beam is made up of at least two parallel or substantially parallel component sensor beams;
receiving and detecting, with the light receiving devices, at least two flashes of light from particulate matter in the wind respectively passing through focal points of the at least two parallel or substantially parallel component sensor beams;
determining, with a controller, transit times each as respective elapsed times between the detected at least two flashes for particulate matter to pass between the focal points; and
determining one or more of the speed and direction of motion of the particulate matter in the wind based on the detected transit times.

24. The method of claim 23, further comprising, upon determining that a vertical wind direction component and the speed of the wind exceeds a predetermined threshold, down-rating or stopping the wind turbine operation.

* * * * *